C. E. COX.
LIQUID LEVEL INDICATOR.
APPLICATION FILED MAR. 24, 1919.
1,381,285.
Patented June 14, 1921.
3 SHEETS—SHEET 1.
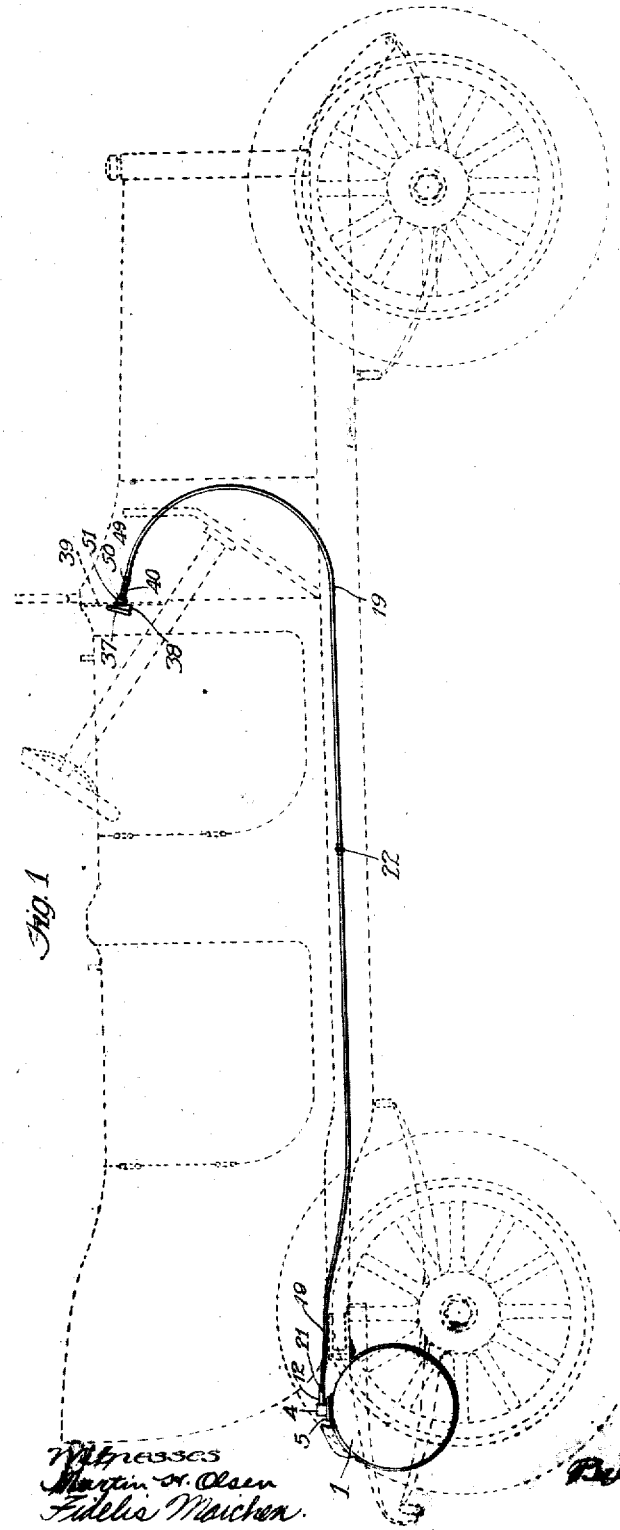
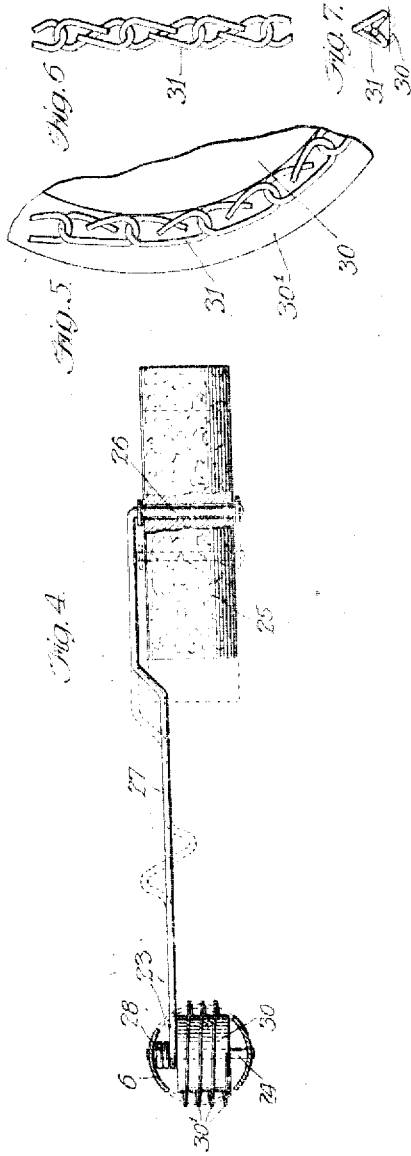

C. E. COX.
LIQUID LEVEL INDICATOR.
APPLICATION FILED MAR. 24, 1919.
1,381,285. Patented June 14, 1921
3 SHEETS—SHEET 2.
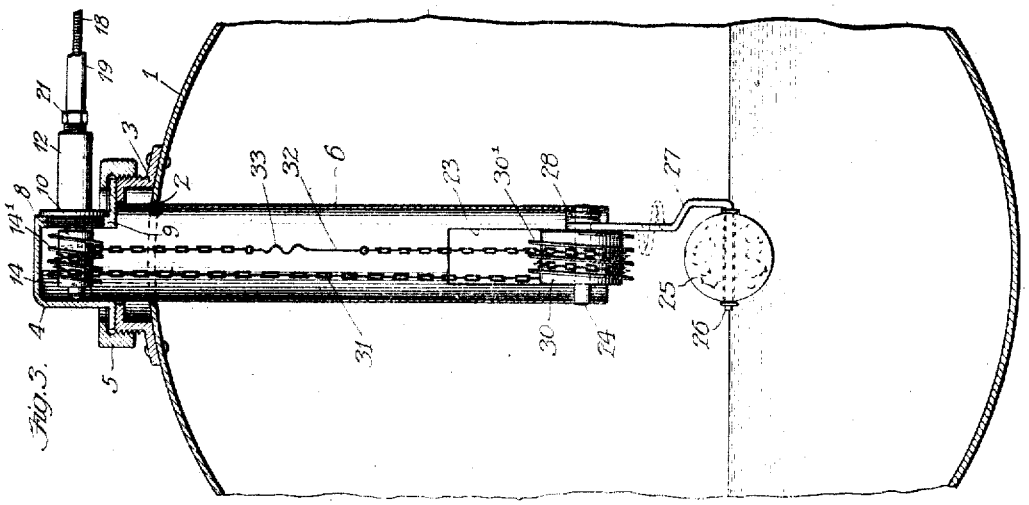
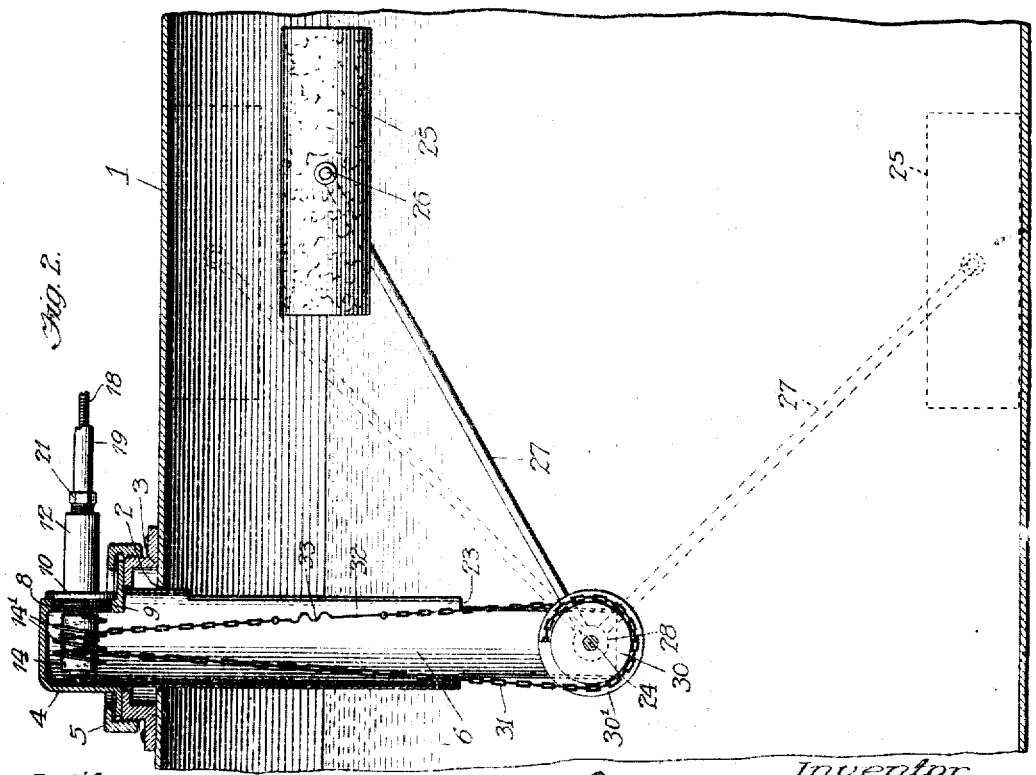

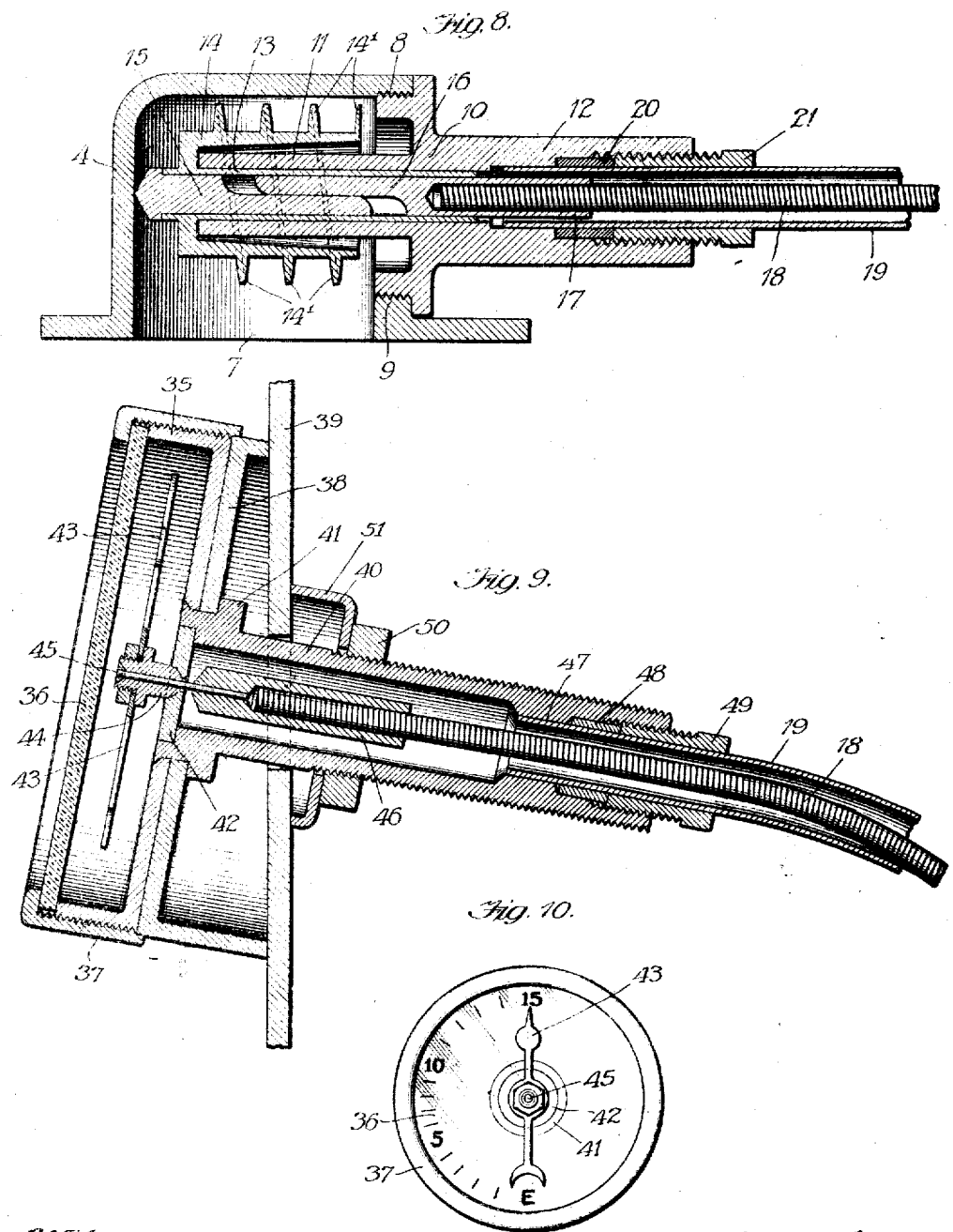

UNITED STATES PATENT OFFICE.

CLAUDE E. COX, OF DETROIT, MICHIGAN.

LIQUID-LEVEL INDICATOR.

1,381,285.

Specification of Letters Patent.   Patented June 14, 1921.

Application filed March 24, 1919.   Serial No. 284,668.

*To all whom it may concern:*

Be it known that I, CLAUDE E. Cox, a citizen of the United States, residing at Detroit, in the county of Wayne and State of Michigan, have invented certain new and useful Improvements in Liquid-Level Indicators, of which the following is a specification.

This invention relates to liquid-level indicators, and particularly, in some of the details of its embodiment, to a mechanism for indicating, at the panel-board of an automobile, the level of the gasolene in a distant gasolene tank, usually at the rear of the car.

The objects of the invention are to provide a construction that may be manufactured at minimum cost in the variety of specially different measurements of certain parts necessary to meet the requirements of different sizes, shapes, and locations of gasolene tanks on automobiles and different panel-board arrangements, and yet operating satisfactorily and accurately under any of the dimensional and directional variations that are thus imposed. In the drawings I have, of course, illustrated only a single embodiment of my invention in a device of single size, but in positions meeting two directional requirements, but advantages, flowing from the construction, in further ability to meet variations of these conditions, will further be pointed out.

Other objects of my invention are to secure intrinsic simplicity and economy of construction, ruggedness, accuracy of operation, ease and sufficiency of lubrication under the conditions imposed by the presence of gasolene and its fumes in the tank; and other and further objects of my invention will become apparent from the following description, as well as the appended claims addressed to features of construction and combinations of parts involved in such invention.

In the drawings Figure 1 is a general view showing a relation between the gasolene tank and point of indication quite commonly found in automobiles, such as that outlined in dotted lines; Fig. 2 represents a longitudinal section through a circular gasolene tank and portions of an indicator float-assembly associated therewith, with the transmission shaft paralleling the longitudinal axis of the tank. Fig. 3 is a transverse section through a gasolene tank of circular section, and the indicator float-assembly parts, with the indicator transmission shaft extending transversely to the longitudinal axis of the tank; Fig. 4 is a plan view of a float arm and drum; Figs. 5, 6 and 7 are details of a transmission chain; Fig. 8 is an axial vertical section through the transmission shaft, drum and housing assembly; Fig. 9 is an axial section through the indicator assembly; and Fig. 10 is a front view of the gage.

In the tank 1 is made a hole 2 surrounded by a base-adapted externally-threaded collar 3. On this collar the head 4 of the "float-assembly" is mounted, its base flange bearing on the crown of the collar and secured by the annular nut-cap 5. The head 4 carries the downwardly extending post 6, preferably a metal tube, cut-away at suitable parts, the head and post forming the rigid frame on which the rotatable parts of the float-assembly are mounted. The head 4 has, in addition to its bottom opening 7 to receive the post, a side opening 8 through which connection may be made from the frame-carried transmission drum to the transmission shaft. One wall portion 9 of the cap is therefore made as a chord of the cap circle and in its threaded opening 8 the bearing member 10 is engaged. This bearing member is preferably a screw cap with long internal and external hubs 11 and 12, the former extending more than halfway across the head 4 and the latter extending well outside to afford ample contact with the connected parts. Both hubs are tubular, the bearing hub 11 internally receiving the hollow shaft 13 of the drum 14, the drum being a cylinder extended back over the hub and connected with the hollow shaft, integrally or in other fixed fashion, by a solid end wall beyond the end of the boss. Said hollow shaft 13 preferably extends to a considerable length into the hub, and it will be observed that this long bearing is quite inaccessible to liquid from the tank even though the cap be liberally splashed, and on the other and the bearing is freely accessible to lubricant entering the hub from the transmission shaft casing to be described. In the end of the hollow shaft there is fixed, as by drive fitting, brazing or otherwise, a coupler 15, having its shaft-inclosed end cut down to semi-circular shape and rounded off at its extremity, for easy inter-fitting with a complementary slip-coupler 16, the outer end 17 of which is connected axially, as by soldering, to the flexible transmission shaft 18. The transmission shaft and its coupler are freely rotatable in the external hub 12 which receives and supports the end of the transmission shaft casing 19. This casing is a tube, preferably of brass or other relatively ductile metal, having secured to it a tight collar 20, borne upon by a coupling nut 21 threaded into a counter-bore on the hub, the end of the tube fitting into a smaller diameter bore adjacent to the end of drum shaft 13. For convenience of mounting the structure on an automobile, the shaft casing 19 may be made in two sections united at any point by an external coupling 22 of any usual form.

At the bottom of tubular post 6 opposite longitudinal slots 23 are cut leaving the lower portion of the tube as a fork affording bearing for the cross shaft 24 to which the float arm and float drum are connected. Float 25 is pivoted on a transverse end portion 26 of a rod or arm 27, the length of which from the shaft 24 must, of course, be in suitable proportion to the distance that the float is to travel between "full" and "empty" indications. The arm may conveniently be made of brass so that by kinking it the length may be varied, as indicated in dotted lines in Fig. 3, and the rod may be bent so that the pivotal axis of the float is at any desired angle to the axis of shaft 24. The inner end of the arm 27 is formed by coiling the brass rod-stock into a hub-coil, so that, in factory practice, the assembled arm and float will always be put on with the float-axis in proper relation to the arm-axis. The attachment of the coil 28 to the shaft may be by soldering.

The drum 30 fixed on the shaft 24 has a radius in proper ratio to that of the transmission drum 14 so that a pre-determined angular displacement of the float arm 27 will cause a pre-determined rotary motion of the transmission drum and shaft. These two drums are chain-connected, the connecting chain 31 being preferably a single piece or running length of chain, wrapped a complete turn or more around each drum and with the ends of the chain located at such point that they never contact with either drum and connected by a variable-length connector 32. This connector is preferably a piece of ductile wire hooked to the two chain ends and crimped as at 33 in such waves as may be needful to produce the requisite tightness of the chain. I prefer that each drum shall have rigidly thereon a spiral rib, as shown respectively at 14' and 30', the spirals, as shown in Fig. 3, extending in like direction so that, when the float-shaft and transmission-shaft are in parallel relation the chain runs in figure-8 form, but with the two straight reaches of the chain separated along the shaft-axes to the extent of one or more convolutions of the spiral-rib so that they never rub together. The spiral grooves of each drum, thus provided, should be long enough to accommodate the shifting of the chain lengthwise of the drum-axes incident to the partial rotation of the drum. With this construction, I find, the shaft 24 may be placed in any angular relation to transmitter shaft 18 within a quadrant, the extremes of which are indicated by Figs. 2 and 3, without materially affecting the smoothness of transmission through the chain. The angle at which the two shafts will stand for any prescribed job will be fixed when the tubular post 6 is secured in the head 4. A chord of the tubular post has to be cut away to accommodate the flat wall of the head when the post is inserted into and fastened in the head, and the angular relation of this chord to the bearing holes for shaft 24 will insure assembly in the intended relation.

It is quite important, for the accurate operation of the device, that the connecting chain shall work uniformly, freely, and with easy flexion with respect to the two drums, to each of which it is preferably soldered near the middle of its center coil, so that the chain does not unwrap to the soldered point. I find that by employing a "double jack" chain as shown in Figs. 5 to 7, that is to say a chain of wire links each link having a back rib and down-turned loops with the fronts of the loops on separated lines, I can secure the desired result by locating the chain so that its links bear at their spread loop-fronts ends or laterally separated curves on the drum surfaces.

The ductile transmission shaft housing 19 is led as need be, preferably in straight lines and smooth curves, to the panel board, on which the gage instrument is located. The gage instrument, as made up to go on a vertical panel board, is preferably set in an inclined position as shown in Fig. 9. The glass fronted housing-cup or gage casing 35, having its glass 36 held on by a screw ring 37, rests upon an inclined adapter or base 38, preferably in the form of an inverted stamped cup having its free edge diagonally cut to the requisite angle if the panel board be vertical, or to any adaptive angle to or to parallelism with the cup bottom if the panel board 39 be sloped. The casing and adapter are united by a hollow stem 40, flanged as at 41 beyond the adapter wall, and spread into locking engagement with the gage cup 35. In a counterbore at its outlet end a small bearing plate 43 is detachably mounted, making a neat fit with the walls of the counterbore, and on this plate the indicator hand or pointer 43 is mounted, preferably on the spherical bearing 44 of the pointer-hub coacting with a similar recess in the bearing plate 43.

Through a center opening in the bearing plate recess there loosely extends a slender stem 45 suitably secured to the pointer hub and soldered or otherwise secured in the end of coupling sleeve 46 in which, also, the end of the transmitter shaft 18 is secured. While the weight of the transmitter shaft holds the hand and its bearing plate properly in place, the cover may be removed and the hand drawn forward, the transmitter shaft pulling out of the slip coupling at its lower end, until the bearing plate 43 is out of its seat, so that lubricant may be run into the opening to distribute itself to all bearing points along the line of the transmitter shaft casing, including the bearing of the transmitter drum 14. The connection of the transmitter shaft casing 19 with the stem 40 is neatly fitted as in a stem bore restriction 47, and beyond this the shaft housing has a fixed collar 48 borne upon by the nut 49 threaded into counterbore in the stem end and holding the parts in proper relation. The stem is externally threaded to receive a nut 50 which abuts against a small adapter cup 51 or other angular washer, the angularity of which is complemental to that of adapter base 38.

In mounting the structure on the car, with the transmitter shaft 18 and its casing properly cut to length, the panel board assembly is mounted on the board, the attached casing-part 19 being free at the coupling 22. The float assembly is then mounted on the tank and its shaft casing-section is coupled to the other by the coupling 22, whereupon the transmitter shaft 18 may readily be slipped home through the gage so that its long coupling portion 10 may engage the drum coupling.

The operation of the device as a motion transmitter will be apparent from the foregoing description of the parts, rise and fall of the float being indicated by the swinging of the hand 43 over an appropriate dial calibrated in accordance with the characteristics of the tank. Preferably I make the hand to swing only in a semi-circle between full and empty positions, and of course the calibration of the dial must be accordant with both the size and the shape of the tank.

While I have herein described in detail a specific embodiment of my invention it will be understood that some of the features are not limited to the precise construction in which they appear in the drawings, and that changes in detail may be made without departure from the spirit of the invention within the scope of the appended claims.

What I claim is:

1. In an indicator of the character described, the combination of a panel-board assembly including a gage casing having an opening, a pointer, a flexible transmitter shaft connected to said pointer and of length to extend to a gasolene tank, and having a slip-coupler member on its remote end, a tank float assembly having a transmission part provided with a complemental slip coupler member, to receive the shaft-carried coupler, and a casing for the flexible shaft coupler, connecting the float and panel board assemblies, whereby the transmitter shaft may be slipped into the shaft casing through the gage casing and into engagement with the transmitter mechanism after the panel board and float assemblies and shaft casing have been placed in position.

2. In a liquid level indicator, a tank-float assembly comprising a frame adapted to be mounted in a tank-orifice; separate drums that are spirally grooved, float means operatively connected to one of said drums, means to connect a reading member to the other drum, and a single length chain engaging the spiral grooves of the drums.

3. In a liquid level indicator, the combination of separated drums, float means operatively connected to one drum, reading means operatively connected to the other drum, and a connector wound in an endless course around the drums, said connector encircling each drum by at least a complete turn, and said drums having spiral ribs thereon forming spiral grooves wherein the chain may run with freedom in any angular position of the drum axes from parallelism to right angles.

4. In a liquid level indicator, the combination of an assembly frame for carrying two drums and constructed to permit disposition of said drums in different angular relations, a tank into which said frame extends, a spirally grooved drum near the top of said frame, a spirally grooved drum near the bottom of said frame, a float operatively connected with the lower drum and a single connector encircling the drums and lying in the spiral grooves, whereby said connector may run with freedom on the drums in any angular position of the drum-axes from parallelism to right-angles.

5. In a liquid level indicator, the combination of a float, a transmission drum, means operatively connecting said float and drum, and reading means operatively connected with said drum, said drum having a shell open at one end, a shaft extending through the open end of said shell and connected to the other end of the drum, and bearing means for the shaft extending between the shell and shaft.

6. In a liquid level indicator, the combination of a float, a transmission drum, means operatively connecting said float and drum, a drum shaft, reading means connected with said drum shaft, a supporting head adapted for engagement with a tank and having therein an elongated hub having an internal journal, said drum shaft bearing in and extending beyond said hub, and the transmission drum being of cup-form having its closed end connected with the shaft and its open end extending back over the elongated hub.

7. The combination, in an indicator of the character described, of a gage having a pointer, a flexible shaft leading from said pointer, a casing for said flexible shaft, an opening to said shaft casing adjacent the gage for giving lubricating-access to said shaft casing, a float-assembly member connected to the end of said casing and affording a journal in a protruding hub, a drum shaft mounted interiorly in said journal, for accessibility to lubricant introduced through the shaft casing, and a drum mounted on the projecting end of said shaft.

8. The combination, in an indicator of the character described, of a gage having a pointer, a flexible shaft leading from said pointer, a casing for said flexible shaft, an opening to said shaft casing adjacent the gage for giving lubricating-access to said shaft casing, a float-assembly member connected to the end of said casing and affording a journal in a protruding hub, a drum shaft mounted interiorly in said journal, for accessibility to lubricant introduced through the shaft casing, and a drum mounted on the projecting end of said shaft and extending back over the hub.

9. In a float construction for a liquid level indicator, the combination of a head adapted to be secured to the tank, having walls disposed in an arc and a connecting rod and a corresponding opening in its base, a transmission member extending through the chord side of said head at right angles to the chord, a cylindrical post fitting into the head opening and having a notch to cooperate with said chord, a transmitting member carried by the bottom of said post and angularly located with respect to the other transmitting member by the position of the chord notch in the tube, and a float arm connected to said lower transmitting member, and means for communicating motion from one said transmitting member to the other.

10. In a liquid level indicator, the combination of a tank, a gage, float means for association with the tank, a transmission shaft for extending to the gage, a gage having a casing and a pointer having its hub making tiltable, self centering bearing on the casing, and a connection suspending the transmission shaft from said pointer hub.

11. In a liquid level indicator for the purpose described, the combination of a tank, liquid level responsive means for connection with said tank, a motion transmitting shaft operatively connected therewith, a casing for said shaft extending to the indicator gage, and a gage having a casing and a pointer with a hub affording a spherical pivot arranged to bear in an open centered spherical recess made in the gage casing, said hub having connection through said recess-opening with said shaft.

12. In a liquid level indicator for the purpose described, the combination of a tank liquid level responsive means for connection with said tank, a motion transmitting shaft operatively connected therewith, a casing for said shaft extending and opening to the indicator gage, a pointer having a bearing pivot connected to the transmission shaft, a plate affording support to said pivot demountably covering an opening to the transmitter-shaft casing.

13. In a gasolene indicator, a gage, a tank, a shaft casing connected with said gage and extending to said tank, a transmission shaft therein, said gage having a pointer pivoted in the gage casing and connected with the transmission shaft in the shaft casing, to suspend said shaft, a float mechanism, a slip connection between said float mechanism and the shaft affording an endwise-separable but rotatively rigid connection between said float-operated transmitting mechanism and the transmission shaft.

CLAUDE E. COX.